April 6, 1926.
D. C. KERR
1,579,620
NUT LOCK
Filed April 21, 1925
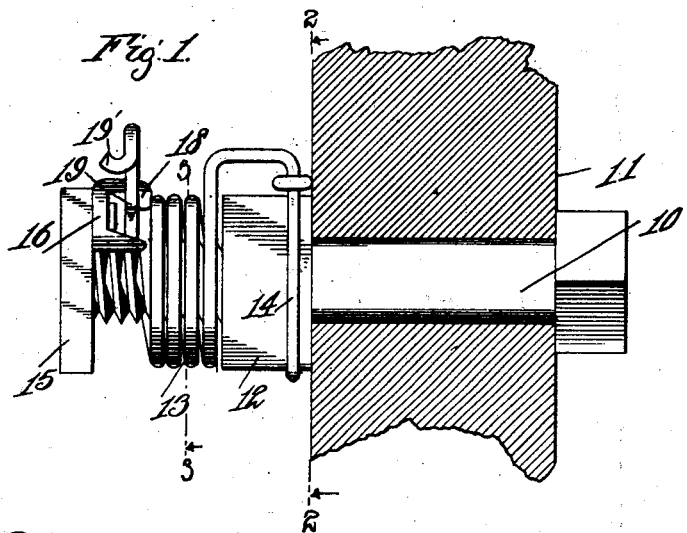
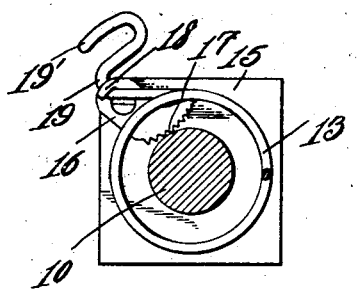
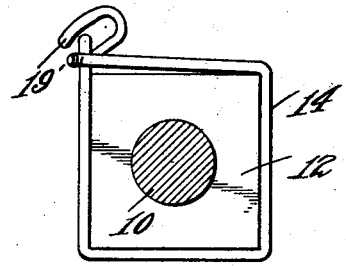
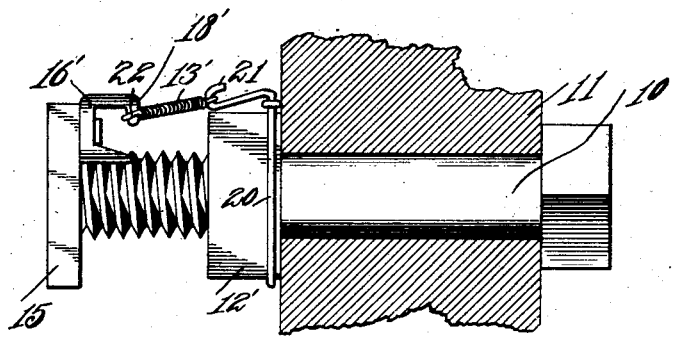
Inventor
Daniel C. Kerr
By
Attorney Patented Apr. 6, 1926.

1,579,620

UNITED STATES PATENT OFFICE.

DANIEL C. KERR, OF SALEM, OREGON.

NUT LOCK.

Application filed April 21, 1925. Serial No. 24,835.

*To all whom it may concern:*

Be it known that I, DANIEL C. KERR, a citizen of the United States, residing at Salem, in the county of Marion, State of Oregon, have invented certain new and useful Improvements in Nut Locks; and I do hereby declare the following to be a full, clear, and exact description of the invention, such as will enable others skilled in the art to which it appertains to make and use the same.

This invention relates to new and useful improvements in nut locks.

One object of the invention is to provide a device for holding a nut tightly against the work, and whereby the nut will be advanced against the work upon wearing of the portion of the work engaged by the nut.

Another object is to provide a spring means for urging the nut against the work, and means for regulating the tension of the spring means.

Other objects and advantages will be apparent from the following description when taken in connection with the accompanying drawing.

In the drawing:

Figure 1 is an elevation of the nut lock in applied position.

Figure 2 is a transverse sectional view on the line 2—2 of Figure 1, looking in the direction of the arrow.

Figure 3 is a transverse sectional view on the line 3—3 of Figure 1, looking in the direction of the arrow.

Figure 4 is a view similar to Figure 1, showing a modified form of the lock.

Referring particularly to the accompanying drawing, 10 represents a bolt which is disposed through the work 11, and has the nut 12 engaged thereon and against the work. Encircling the threaded portion of the bolt, outwardly of the nut 12, is a coil spring 13, one end of which is bent into a square frame 14, which closely embraces the nut. Threaded on the bolt, outwardly of the other end of the coil spring 13, is a nut 15, and pivotally mounted on the inner face of this nut 15, is a pawl 16. The inner end of the pawl is formed with a toothed face 17, which engages with the threads of the bolt, while the other end of the pawl is formed with a hook 18, with which is engaged the hooked end 19, of the coil spring 13. The hooked end of the spring is provided with an extension 19', formed for engagement by a suitable tool to disengage the hooked end from the pawl. The pawl engages with the threads of the bolt in a direction to prevent retrograde movement of the nut 15, so that when the said nut is rotated forwardly, on the bolt, the engaged end of the spring will be moved to wind the spring, whereby to increase the tension thereof, and cause the nut 12 to turn more closely into engagement with the work.

After the nut 12 has been properly driven up against the work, the nut 15 is turned to place the spring under tension, thereby producing a forward urging action on the nut 12, which will keep said nut tightly against the work. Should the work face wear, to such an extent as to cause the nut 12 to become loose with respect thereto, the tension of the spring will cause the nut 12 to be turned up tightly against the work.

In Figure 4 there is shown a modified form of the lock, which includes the length of wire 20, bent into square form for encircling the nut 12', and connected to an eye 21, formed at one corner of the wire frame 20, is one end of a coil spring 13', the other end of the spring being formed with a hooked portion 22, similar to the hooked end 19, of the first form, and engaged with the hook 18', of the pawl 16'. This spring 13' does not encircle the bolt, as does the spring 13, but is drawn around the bolt, as shown in Figure 4. The effect on the nut 12', and the pawl 16' is the same as in the other forms. The tension of the spring 13' is regulated by the nut 15', which is constructed, arranged, and operated in a manner identical with that of the nut 15.

What is claimed is:

1. In a nut lock, the combination with a bolt and its work engaging nut, of a spring means engaged with the nut for urging the latter against the work, means threaded on the bolt and operatively connected with an end of the spring means for regulating the tension of the spring means, and locking means on the threaded means for automatic engagement with the threads of the bolt.

2. In a nut lock, the combination with a bolt and its work engaging nut, of a spring encircling the bolt and having one end connected with the nut, an auxiliary nut on the bolt, means on the auxiliary nut for engagement with the bolt to prevent retrograde movement of the last-named nut, the other end of the spring being engaged with the last-named means for urging the said means into engagement with the bolt and at the same time urging the work engaging nut against the work.

3. In a nut lock, the combination with a bolt and its work engaging nut, of a coil spring encircling the threaded portion of the bolt and having one end embracing the nut, an auxiliary nut on the bolt, a pawl on the auxiliary nut engaged with the threads of the bolt, and the other end of the spring being engaged with said pawl.

4. In a nut lock, the combination with a bolt and its work engaging nut, of a coil spring encircling the bolt and having one end embracing the nut, an auxiliary nut engaged on the bolt, and a pawl pivotally carried by the auxiliary nut and engaged with the threads of the bolt, said pawl having a hooked end, and the other end of the spring having a hooked end engaged with the hooked end of the pawl for urging the pawl into engagement with the bolt and the work engaging nut against the work.

In testimony whereof, I affix my signature.

DANIEL C. KERR.